Inventor
Edward J. Powell
By Lester Sargent
Attorney

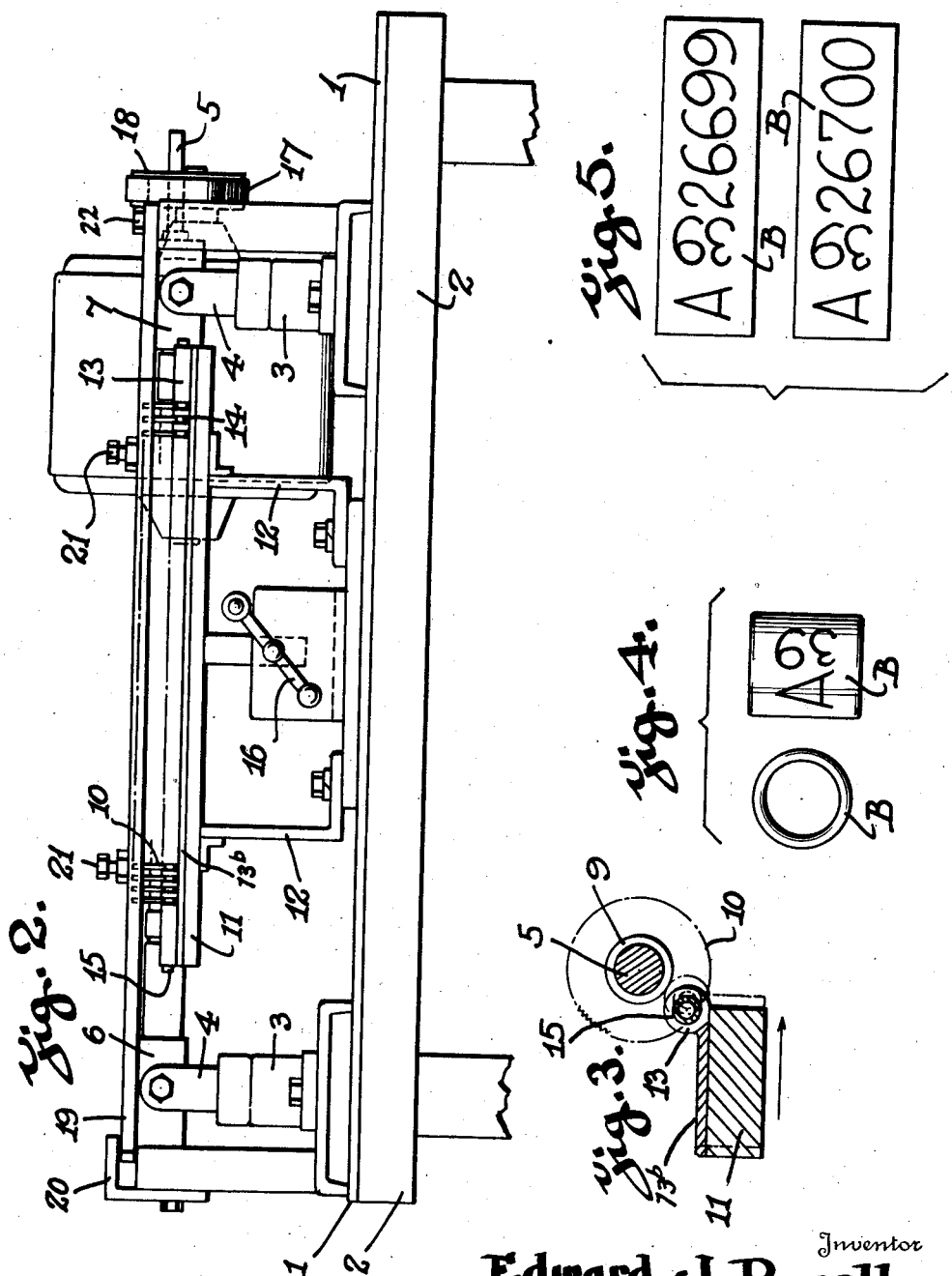

Patented June 29, 1943

2,323,100

UNITED STATES PATENT OFFICE 2,323,100

MACHINE FOR CUTTING LEG BANDS

Edward John Powell, Kansas City, Mo.

Application October 15, 1941, Serial No. 415,126

6 Claims. (Cl. 29—70)

The object of my invention is to provide a novel machine for cutting a tube of aluminum or other suitable light material of small diameter into a series of short cylinders for use as leg bands for pedigreed canary birds and possibly for other birds such as poultry.

It is also an object of my invention to provide a machine of this character having a detachable tube holding member so that a tube holding member of different diameter may be substituted for holding a tube of larger diameter.

It is also an object of my invention to provide means for spacing the multiplicity of circular saw blades a like distance apart; to provide simple means for moving the tube to be operated upon into position to be cut into sections by the saw blades; and to provide a novel clamp bar for more rigidly holding the mechanism against vibration should that be required as the result of wear of the apparatus.

I attain these and other objects of my invention by the mechanism illustrated in the accompanying drawings, in which—

Fig. 2 is a side elevation of same;

Fig. 3 is a transverse section on a line between any two of the circular saw blades;

Fig. 4 is a detail enlarged view of the leg band after completion; and

Fig. 5 is a plan view of two of the leg bands spread out straight and illustrating the designations that are placed on the leg bands.

Like numerals designate like parts in each of the several views.

Figure 1:
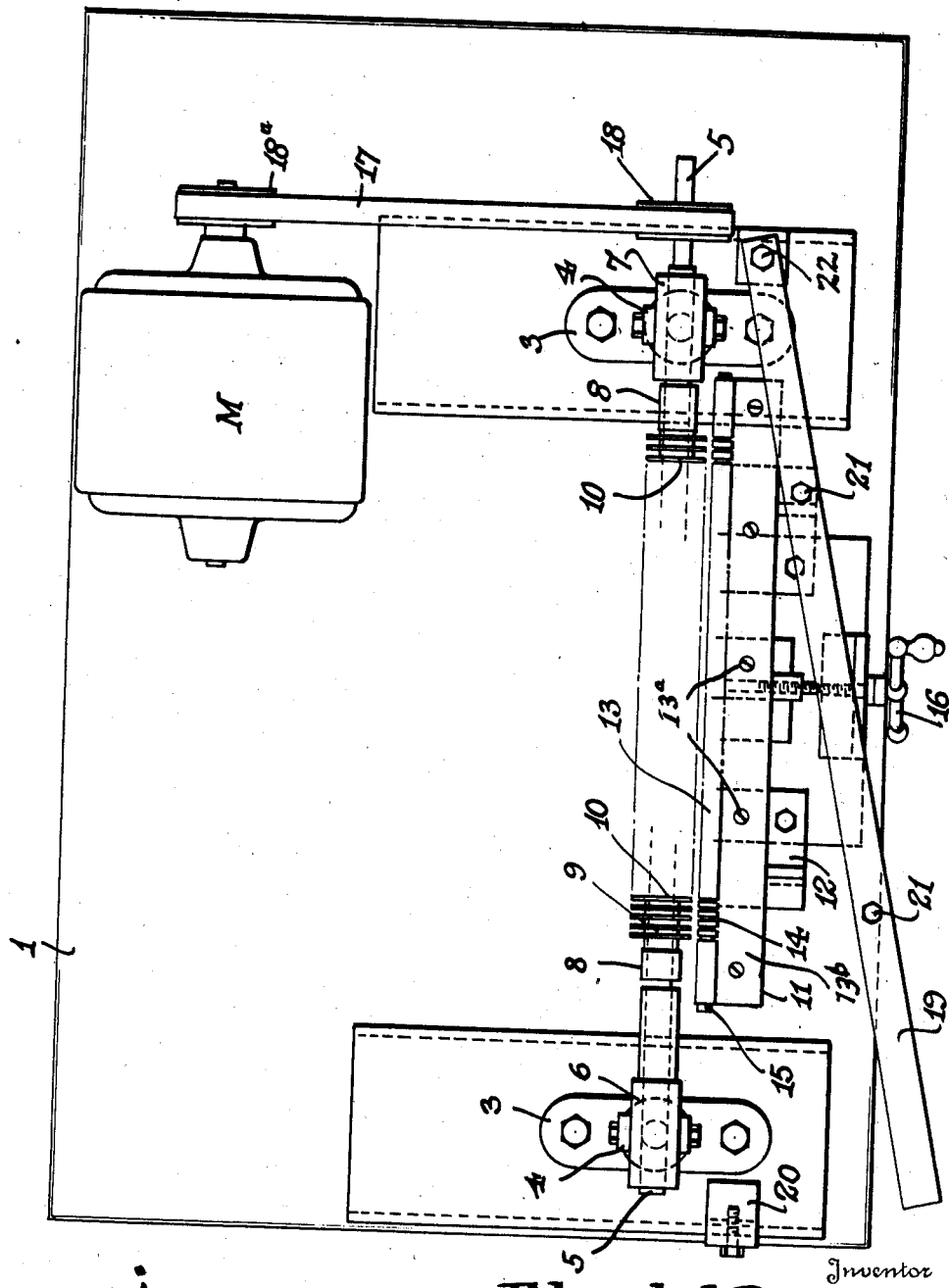
Figure 1 is a top plan view of the invention.

Referring to the accompanying drawings, I provide a base 1, preferably of metal mounted on a suitable main table 2. Mounted on the base 1 are standards 3 and mounting members 4 which support the end bearings 6 and 7, which in turn carry the spindle or rotatable shaft 5 on which are mounted a multiplicity of circular saw blades 10, each separated from the adjacent blade by a washer 9. Bearing 7 supports the driven end of the rotatable shaft 5 while bearing 6 supports the free end of the rotatable shaft. Two nuts or screw tighteners 8, near each end of the rotatable shaft and adjacent the outer washers adjacent the respective outermost circular saw blades 9, provide means for tightening the circular blades and washers into their proper position.

As shown in Figs. 1 and 3, I provide an integral metal plate and tube 13 which is detachably fastened by screws 13a to the table block 11. Table block 11 is loosely mounted on metal tracks 12 which in turn are rigidly secured to the base 1 on main table 2, as shown in Fig. 2. A metal plate 13b is removably attached to table block 11 by screws 13a. Preferably tube 13 is either soldered on or made integral with the metal plate 13b and is provided with a series of equally spaced slots 14 through the tube 13, of just sufficient width to permit the circular saw blades 10 to enter them without any frictional contact, with leg band holding tube 13. A leg band tube 15 of suitable light material is inserted in the tube 13 and held by that tube for the sawing operation. Table block 11 and the plate 13b and leg band holding tube 13 affixed to it are operated toward and from the circular saw blades by a suitable hand screw feed 16, as shown in Figs. 1 and 2.

Rotatable shaft 5 at one end carries a pulley 18 which is driven by a belt 17 directly connecting it with pulley 18a of electric motor M, as shown in Fig. 1.

For the purpose of reducing any vibration that might develop in the course of time from wear of the apparatus, I provide a pivotally mounted bar 19, pivoted at one end on bolt 22 at one end of the machine and extending to and engaging under the L-shaped clamp 20 at the other end of the machine. This bar carries spaced screws or pins 21 which are of suitable length to press on the metal fixed base plate 13b tightly enough to prevent vibration but not enough to prevent movement of the plate by the screw 16, thereby reducing the vibration of the machine to a minimum.

Figs. 4 and 5 illustrate, on an enlarged scale, a leg band for pedigreed canary birds bearing the insignia such as is impressed or stamped on these bands to identify a particular canary bird by number, by year date, and by the trade-mark of the International Association of Canary Bird Breeders, or other suitable insignia such as that of a poultry breeding association.

In operation, the machine is preferably arranged with a series of 100 circular saw blades 10, each spaced a short distance apart, preferably $\frac{3}{16}$ of an inch by intervening washers 9 and held rigidly in that position by the nuts or screw tighteners 8 at each end.

The leg band tube 15 is preferably of aluminum and is approximately $\frac{1}{8}$ of an inch in diameter for canary birds. For leg bands for pedigreed poultry the band holding tube 13 and leg band tube 15 will be of a larger diameter. The tube 13 is solid or made integral with the plate 13b, which latter member is removably mounted on the tube block 11 to permit of substituting another plate 13b and band holding tube 13 of larger diameter if desired.

To operate the device, the motor is set in operation driving the rotating shaft 5 and the spaced circular saw blades; and the holding tube 13 with its leg band tube 15 is moved toward the circular saw blades by operating the hand screw feed 16. The blades enter the slots 14 of tube 13 and cut the inner tube into short cylindrical lengths of approximately $\frac{1}{16}$ of an inch. Prior to cutting the leg band tube 15 into the desired short length of leg bands, the appropriate number and year and trade-mark designation are impressed on the tube at the appropriate and desired intervals. After completion of the cutting of the leg band tube 15 to the desired length, the table block 11, plate 13a and tube 13 are moved to a retracted position by operating the hand screw feed 16 in a counter-clockwise direction. It will be noted that the supports 12 are in the form of tracks extending in a direction at right angles to that of the rotating shaft 5 and tube 13 and that the table block 11 is readily slidable on the track 12.

What I claim is:

1. In a machine for cutting leg bands of the type described, the combination of a rotatable shaft, means for driving same, a multiplicity of circular saw blades mounted on the rotatable shaft, means for spacing the saw blades a like short distance apart, a leg band holding tube having slots corresponding in position with and spaced to receive the correspondingly positioned saw blades without frictional contact therewith and adapted to receive a leg band tube of light material such as aluminum, a metal plate to which said leg band holding tube is rigidly affixed, and means for moving said tubes toward and from the circular saw blades.

2. In a machine for cutting leg bands of the type described, the combination of a rotatable shaft, means for driving same, a multiplicity of circular saw blades mounted on the rotatable shaft, means for spacing the saw blades a like short distance apart, a leg band holding tube having slots corresponding in position with and spaced to receive the correspondingly positioned saw blades without frictional contact therewith and adapted to receive a leg band tube of light material such as aluminum, a metal plate to which said leg band holding tube is rigidly affixed, a table block on which said metal plate is removably fastened, tracks extending in a plane at right angle to that of the rotatable shaft to permit of moving the aforesaid metal plate and leg band holding tube toward and away from the circular saw-blades, and means for moving the leg band holding tube, metal plate and table block toward or away from the circular saw blades.

3. In a machine for cutting leg bands of the type described, the combination of a rotatable shaft, means for driving same, a multiplicity of circular saw blades mounted on the rotatable shaft, means for spacing the saw blades a like distance apart, a leg band holding tube having slots corresponding in position with and spaced to receive the correspondingly positioned saw blades without frictional contact therewith and adapted to receive a leg band tube of light material such as aluminum, a metal plate to which said leg band holding tube is rigidly affixed, a table block on which said metal plate is removably fastened, tracks extending in a plane at right angles to that of the rotatable shaft to permit of moving the aforesaid metal plate and leg band holding tube toward and away from the circular saw blades, and manually operated means for moving the leg band holding tube, metal plate and table block toward or away from the circular saw blades.

4. In a machine for cutting leg bands of the type described, the combination of a rotatable shaft, means for driving same, a multiplicity of circular saw blades mounted on the rotatable shaft, washers interposed between successive saw blades to space them all a like distance apart, means for tightly securing the washers and saw blades in a fixed position on the rotatable shaft, a leg band holding tube having slots corresponding in position with and spaced to receive the correspondingly positioned saw blades without frictional contact therewith and adapted to receive a leg band tube of light material such as aluminum, a metal plate to which said leg band holding tube is rigidly affixed, and means for moving said tubes toward and from the circular saw blades.

5. In a machine for cutting leg bands of the type described, the combination of a rotatable shaft, means for driving same, a multiplicity of circular saw blades mounted on the rotatable shaft, washers interposed between successive saw blades to space them all a like distance apart, means for tightly securing the washers and saw blades in a fixed position on the rotatable shaft, a leg band holding tube having slots corresponding in position with and spaced to receive the correspondingly positioned saw blades without frictional contact therewith and adapted to receive a leg band tube of light material such as aluminum, a metal plate to which said leg band holding tube is rigidly affixed, means for moving said tubes toward and from the circular saw blades, and means engageable with the aforesaid metal plate to reduce vibration to the minimum.

6. In combination with the mechanism defined in claim 5, the last mentioned means comprising a bar pivotally secured to the machine at one end and carrying a plurality of downwardly extending pins and adapted to engage the top surface of the metal plate to which the leg band holding tube is affixed, and a clamp at the opposite end of the machine under which the free end of said bar may be clamped.

EDWARD JOHN POWELL.